United States Patent [19]
Philibert

[11] 3,833,754
[45] Sept. 3, 1974

[54] GROUNDING CONNECTOR FOR STRAND CABLE ASSEMBLY
[75] Inventor: Robert A. Philibert, Long Island, N.Y.
[73] Assignee: General Signal Corporation, Rochester, N.Y.
[22] Filed: Apr. 23, 1973
[21] Appl. No.: 353,289

[52] U.S. Cl............... 174/65 SS, 174/78, 174/89, 285/149, 285/161
[51] Int. Cl........................................... H02g 15/00
[58] Field of Search .......... 174/65 SS, 77 R, 78, 89, 174/65 R; 285/158, 161, 149, 354; 24/122.3, 122.6

[56] References Cited
UNITED STATES PATENTS
2,355,403   8/1944   Tripp ............................... 174/65 R
FOREIGN PATENTS OR APPLICATIONS
256,019   10/1963   Australia ........................ 174/65 SS
257,426   5/1963   Australia ......................... 174/65 SS
271,067   5/1965   Australia ......................... 174/65 SS
635,148   12/1927   France ................................ 285/158
832,589   4/1960   Great Britain ....................... 174/78
912,306   12/1962   Great Britain ....................... 174/89

Primary Examiner—Laramie E. Askin
Attorney, Agent, or Firm—George W. Killian; John Ohlandt

[57] ABSTRACT

A cable grounding connector is disclosed which is adapted to be used with cable type SNM (Shielded Non-Metallic-Sheathed). The cable connector arrangement fulfills the "pullout" and equipment grounding conductor continuity requirements of the National Electrical Code. An adapter or connector body fits over the hub provided at one end of the intermediate body, or fitting, for the connector. This insures that a pair of flat plates or washers, which abut the hub, are effective to firmly clamp the strands of the grounding conductors.

5 Claims, 4 Drawing Figures

GROUNDING CONNECTOR FOR STRAND CABLE ASSEMBLY

BACKGROUND, OBJECTS AND SUMMARY OF THE INVENTION

The present invention relates to a cable connector and more particularly to a connector that is suitable for connecting what are known as type SNM cables to a distribution panel or other housing.

For a complete background to the subject matter of the present invention, reference may be made to Article 337 of the National Electrical Code which covers shielded non-metallic-sheathed cable Type SNM. It is considered sufficient, however, for purposes of the present invention to note that this Type SNM cable is a factory assembly of two or more insulated conductors in an extruded core of moisture resistant, flame resistant non-metallic material, covered with an overlapping spiral metal tape and wire shield and jacketed with an extruded non-metallic material, that is resistant to destructive environmental conditions. It should also be noted that the wire shield consists of suitably wrapped grounding conductors. Such cable, because of the double jacketing and the grounding conductors situated between the two jackets, affords a certain amount of mechanical protection to the circuit conductors which are located at the cable core, in addition to providing the function of a low impedance electrical path for ground fault currents.

The cable grounding connector of the present invention falls into a broad category of cable connectors which have the function of gripping a cable so as to provide strain relief and thereby keep the load conductors from being pulled away from the terminal situated in the panel or housing in the event that a force is placed on the cable exterior to the panel.

For an appreciation of one kind of cable connector which serves to grip a cable, reference may be made to a 1972 catalog of the Gedney Electric Company, Terryville, Connecticut, page 48 thereof. This type of connector relies on the grommet or bushing which surrounds the cable and functions to grip the cable. However, in the case of hazardous locations this grommet cannot be depended upon to provide the only means of strain relief since the grommet may be subjected to various chemicals in the particular atmosphere encountered so as to cause it to deteriorate and lose its gripping ability.

In the context of the present invention the aforesaid grommet merely functions to keep liquid, dirt and dust from entering the enclosure and reliance is placed instead upon a pair of rings for the purpose of gripping the grounding conductor, thereby to prevent pullout. In other words, the present invention provides a method of sandwiching the ends of grounding conductors between two rings and clamping the rings firmly together.

A general technique and structure for a cable connector to be used in destructive and hazardous environments may be appreciated by reference to a 1972 catalog of the Crouse-hinds Company in a section entitled "New NE Code Type SNM Cable Connectors". For convenience, the essential structure described in the catalog is shown hereinafter (in FIG. 1 of the drawing) for comparison with the present invention.

It is a basic object of the present invention to improve upon the structure of a cable connector which operates to clamp the grounding wires or conductors for Type SNM cable so as to insure that the connector can withstand pullout forces of 300 pounds or greater while at the same time providing grounding continuity.

Another object, in furtherance of the basic object, is to provide a connector which is extremely simple to manufacture, compared with other connectors already known.

Another object is to manufacture or provide such connector from standard parts which have been used in conventional cable or cord grip connectors.

The above objects are fulfilled and implemented by the several features of the present invention. In accordance with the principal feature thereof, the cable connector consists of a more or less conventional fitting or intermediate hollow body. This body comprises first and second hub portions at either end which are independently threaded. Its middle portion is provided with an hexagonal flange for holding or tightening the connector. The aforenoted grommet fits into the bore at one end of what may be considered the outer one of the hubs. In use of the connector the cable extends through the bore which is continuous through the first and second hubs. Preferably, a pair of rings in the form of flat washers are provided for clamping the fanned-out strands of the grounding conductors which are exposed when the connector is to be applied. These rings have equal diameters and such diameters are substantially equal to the diameter of the outside of the hub at the inner end of the intermediate fitting or body.

Accordingly, there is no need to provide special castings or machine-cut bar stock for the rings to be employed in the connector.

Another advantage of the connector of the present invention is that it makes the connector easy to install since the clamping rings which retain the grounding wires or conductors, are of substantially the same diameter as the hub at the inner end of the fitting, and therefore are held outside of that hub in the installation procedure. This differs completely from the situation presented with the prior art technique, according to which the clamping rings cannot be held together out in the open but must be pulled up into the recess or bore of the aforesaid inner hub. This is because the installation procedure is such that the connector body has to be tightened into the intermediate body.

In addition to the aforesaid structure for the connector of the present invention, an adapter or connector body is also specially fashioned, that is to say, it is provided with a threaded hub that engages with the hub at the inner end of the fitting so as to surround the latter hub, the latter hub having threads on its outer surface, whereas the adapter has its corresponding threads on the inner surface of its hub.

Other features and advantages of the present invention will be appreciated from the description of a preferred form of the present invention in connection with the accompanying drawing.

DESCRIPTION OF PREFERRED EMBODIMENT

Figure 1:
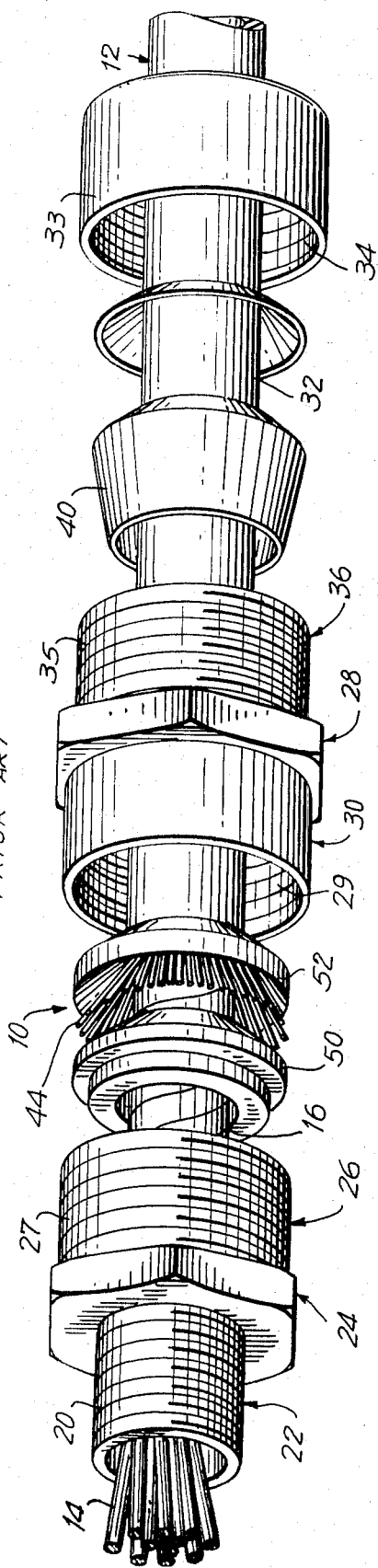
FIG. 1 is an exploded view of a cable connector device known in the prior art.
Figure 2:
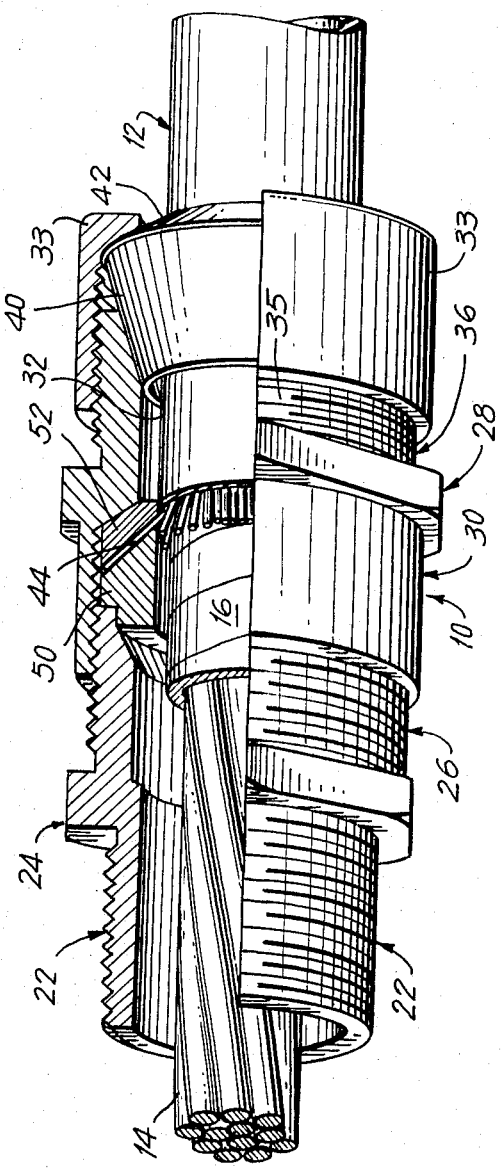
FIG. 2 is a cut-away perspective view of the same cable connector device as is shown in FIG. 1.

Referring now to the Figures of the drawing, and more particularly for the moment to FIGS. 1 and 2, there is illustrated a cable connector device known in the prior art. The connector device 10 is especially designed and adapted to be used for connecting type SNM, shielded non-metallic-sheathed cable, such cable being generally indicated by reference numeral 12. There will be seen at the left in the several views a plurality of individual conductors 14, which are covered with a non-metallic material constituting an inner jacket 16. It should be noted that the left end of the cable is the terminal or housing end; that is to say, the end which is secured to the terminal, panel or housing. Therefore, for purposes of this description, this left end of the structure shown in FIG. 1 will be referred to as the inner end, and the right end will be referred to as the outer end for obvious reasons. A suitable lock nut, not shown, is adapted to engage with threads 20 on the hub 22 of the adapter or connector body 24; although, as will be apparent to the worker skilled in the art, other suitable termination may be made to the hub 22. A suitable knock-out dust-sealing ring, also not shown, is fitted over the threads 20 in securing the adapter 24 to the panel. The outer hub 26 of the adapter is provided with threads 27 on its outer surface and is fitted tightly together with intermediate body or fitting 28, which is provided with interior threads 29 on its inner hub 30 for such engagement.

Toward the outer end of the assembly, the outer covering or jacket 32 will be seen, and it will be understood that this jacket surrounds a spiral metal tape and a wire shield arrangement for grounding purposes. A bushing or gland nut 33 fits over the outer covering and is provided with inner threads 34 which engage the threads 35 on the outer hub 36 of the intermediate body or fitting 28.

A grommet 40 fits within the inner bore of the hub 36 in conventional manner and a washer 42 assures even compression of the grommet. The grommet, as can be seen in FIG. 2, projects beyond the hub 36 when the connector is installed; that is to say, it is not completely surrounded by such hub. Its basic purpose is to insure gripping of the cable 12; therefore, it is designed to be firmly pressed against the covering 32 of the cable.

For reasons already given, the use of the grommet 40 for the purpose of gripping the cord or cable is not completely satisfactory when unusual and hazardous environments are encountered. This is especially so in the case of the typical polyvinyl-chloride grommet, which tends to deteriorate in certain unfavorable environments.

Grounding continuity is established by the structure shown in FIG. 1 by reason of the arrangement of the grounding conductors 44, the ends of which are sandwiched between the two rings 50 and 52. It will be seen that the grounding conductors are fanned out and separated so that they may be firmly held by the two rings. This holding, or clamping action, increases the pullout forces that the connector will withstand. However, the two rings 50 and 52 illustrated in FIG. 1 are machined elements; moreover, it will be appreciated that the arrangement is such that the two rings are brought tightly together when the connector body 24 is wrench-tightened into the intermediate body 28.

Figure 3:
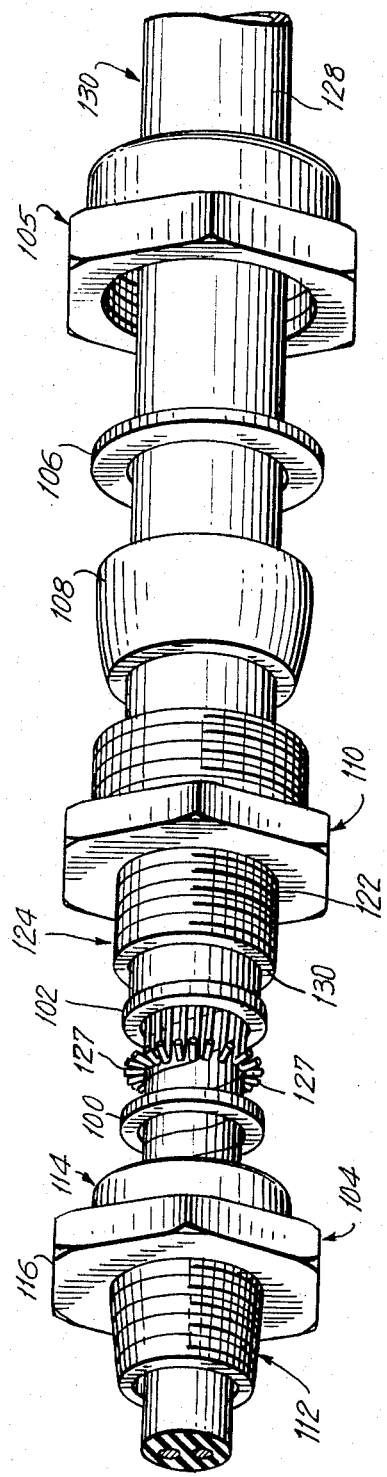
FIG. 3 is an exploded view of a cable connector device in accordance with the present invention.
Figure 4:
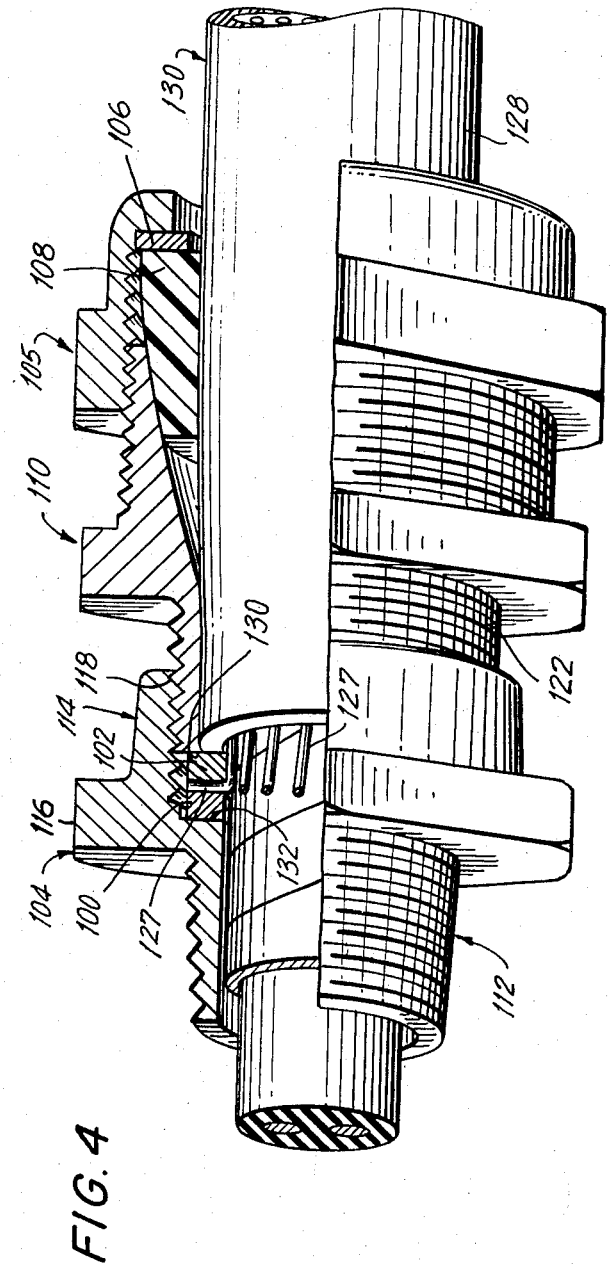
FIG. 4 is a cut-away perspective view of the device of the present invention.

The unique advantages which are achieved with the present invention can be appreciated by reference to FIGS. 3 and 4. By means of the design and construction therein illustrated, two inexpensive punched rings 100 and 102 can be utilized. In addition, the adapter or connector body 104 is so constructed so that it uniquely cooperates with the rings 100 and 102 so as to produce firm gripping of the grounding wires as well as to provide grounding continuity.

As was the case with the prior art connector body of FIGS. 1 and 2, the left end is the inner end, which is to be connected to a distribution panel or other housing. The other parts are similar to those described in connection with the prior art device; thus, the gland or bushing nut 105, washer 106, and grommet 108 are substantially the same as the corresponding parts illustrated in FIGS. 1 & 2. However, the intermediate body or fitting 110 differs from its opposite number in that it is designed to cooperate with the connector body or adapter 104 which comprises two hubs, an inner hub 112 of a relatively small diameter and an outer hub 114 of larger diameter. A hexagonal portion 116, for wrench-tightening purposes, is also provided as part of the adapter 104. The outer hub 114, unlike its opposite number of FIG. 1, is provided with interior threads, that is threads 118 within the bore of the outer hub 114, which threads are adapted to engage with the threads 122 on the inner hub 124 of the fitting 110.

In the installation of the connector of the present invention, the grounding conductors 127 are exposed by removal of the outer covering 128 of the cable 130. The grounding conductors are fanned out and placed between the two rings 100 and 102. The entire cable is then pulled up against the hub 124 and, since the diameter of the rings 100 and 102 is great enough, the rings abut the inner end of hub 124 and cannot pass into the bore of hub 124. Thereafter, the adapter 104 is fitted over the hub 124, the internal diameter of the bore of hub 114 being such that the threads 118 formed therein engage the threads 122 of hub 124. It will be seen that the base carrying the threads 118 extends for a distance substantially less than the distance of the threads on hub 124. Hence, the adapter effectively clamps the rings 100 and 102 together and since the fanned-out grounding conductors 127 are sandwiched between the rings, the grounding conductors are very tightly held.

It will be understood that the individual grounding conductors are normally cut off such that they do not extend radially beyond the periphery of the rings 100 and 102. However, if they should happen to extend slightly beyond that point there will be no problem created because, in the turning engagement of adapter 104 with fitting 110 the action will be such that the ends of the grounding conductors will tend to be twisted in the tightening direction, and therefore the tendency will be countered and relieved when the adapter is being removed. Essentially, then, there is no possibility of jamming of the ends of the grounding conductors within a bore or recess when the adapter is placed in position and tightened.

It should be noted that in tests that were conducted on exemplary connector devices made in accordance with the description herewith furnished, it was found that considerable force was necessary to pull out the grounding conductors even though the rings 100 and 102 were not held tightly together. Moreover, when these rings were compressed it was found that the grounding conductors broke before they were pulled free from between the two rings.

While there has been shown and described what is considered at present to be the preferred embodiment of the invention, it will be appreciated that other embodiments can be utilized. For example, the clamping rings 100 and 102 can, under appropriate circumstances, be dispensed with. In such a case, the fanned-out ends of the grounding conductors 127 would directly contact and be held between the end 130 of hub 124 and the shoulder 132 suitably provided at the interior of the adapter 104 (FIG. 4).

Other modifications will readily occur to those skilled in the related arts. It is believed that no further analysis or description is required and that the foregoing so fully reveals the essence of the present invention that those skilled in the applicable arts can adapt it to meet the exigencies of their specific requirements. It is desired, therefore, that the invention not be limited to the embodiment shown and described, and it is intended to cover in the appended claims all such modifications as fall within the true spirit and scope of the invention.

What is claimed is:

1. A cable grounding connector having an inner end for placement adjacent a distribution panel or the like, said connector being adapted to surround a cable, which includes a plurality of grounding conductors, so as to provide grounding continuity and strain relief for the cable, comprising:
   a fitting formed by a continuous hollow body having a hub at either end and adapted to surround the cable, including said grounding conductors;
   a pair of metal rings adjoining the hub at the inner end of said fitting, which end is to be placed nearer than the other end to said distribution panel, for receiving between them the ends of said grounding conductors, each of said rings having a planar radial surface confronting the other;
   an adapter, engaging with the hub at the inner end of said fitting so as to surround said inner end and to firmly clamp said pair of rings, thereby to hold securely the ends of said grounding conductors.

2. A connector as defined in claim 1, in which each of said metal rings has planar radial surfaces at both ends thereof, and each has a fixed outer diameter.

3. A connector as defined in claim 1, in which the hub at the inner end of the fitting has threads at the outer surface thereof; said adapter having a corresponding hub provided with engaging threads at the inner surface thereof.

4. A connector as defined in claim 1, in which the hub at the outer end of said fitting is provided with threads, and further comprising a bushing engaging said outer end hub, and a gland nut fitting over said bushing and engaging with said outer end hub.

5. A connector as defined in claim 1, in which said metal rings are of equal diameter, both inner and outer, said outer diameter being substantially equal to the outer diameter of said hub at the inner end of said fitting.

* * * * *